Dec. 6, 1927.  1,652,054

K. SCHLAGENHAUFF

VALVE FOR PIPING OF LARGE DIAMETER

Filed Nov. 7, 1925   5 Sheets-Sheet 1

K. Schlagenhauff
INVENTOR

By: Mason & Clark
ATTYS

Dec. 6, 1927.　　　　　　　　　　　　　　　　　　　　1,652,054
K. SCHLAGENHAUFF
VALVE FOR PIPING OF LARGE DIAMETER
Filed Nov. 7, 1925　　　　　5 Sheets-Sheet 3

K. Schlagenhauff
INVENTOR

By: Markes and Clarke
ATT'YS

Dec. 6, 1927.  
K. SCHLAGENHAUFF  
1,652,054  
VALVE FOR PIPING OF LARGE DIAMETER  
Filed Nov. 7, 1925  
5 Sheets-Sheet 4

Patented Dec. 6, 1927.

1,652,054

UNITED STATES PATENT OFFICE.

KARL SCHLAGENHAUFF, OF BERLIN-CHARLOTTENBURG, GERMANY, ASSIGNOR TO MASCHINENBAU-AKTIENGESELLSCHAFT VORM. STARKE & HOFFMANN, OF HIRSCH-BERG, GERMANY.

VALVE FOR PIPING OF LARGE DIAMETER.

Application filed November 7, 1925, Serial No. 67,571, and in Germany March 24, 1925.

The invention relates to a valve for piping of large diameter which is usually submitted to a high pressure, particularly hydraulic pipe lines and the like. In valves of this type, it is a matter of importance to secure a permanently water-tight closure, and further a construction must be provided which permits easy movement from the closed to the open position notwithstanding the heavy pressure to which the valves are exposed.

The known types of valves such as sluice valves, flap valves, slide valves, ball valves and the like, each possess certain advantages, which are accompanied, however, by disadvantages. The ball valve, which may, perhaps, be regarded as the most satisfactory type known up to the present, has the disadvantage that its closing surface is raised from the seating prior to the opening movement so that foreign bodies can easily enter the gap and may affect the water-tight closure adversely.

A type of valve employed as a relief valve for fire hose has been proposed having two cylinders arranged at right angles to the direction of flow in the hose, with recesses, which, when the valves are fully open, form a continuation or projection of the internal diameter of the hose. In one position this valve serves to connect the nozzle to the hydraulic main, whilst in another position it allows that part of the hose lying between the nozzle and the valve to be drained, the hydraulic main being cut off. The present invention is based on the recognition of the fact that a relief valve of this type offers special advantages when employed as a stop valve for hydraulic mains and similar piping of very large diameter, since it combines the advantages of all known arrangements without having any of their drawbacks; in particular, a valve of this type, when constructed in accordance with the invention, and contrary to the known type of relief valve possesses the important advantage of permanent tightness inasmuch as the recesses are so inclined towards the inflow side while the valve is being closed that the water pressure tends to force the cylinders towards one another similarly to a lock gate The invention is illustrated by way of example in the drawings in which:

Figure 1:
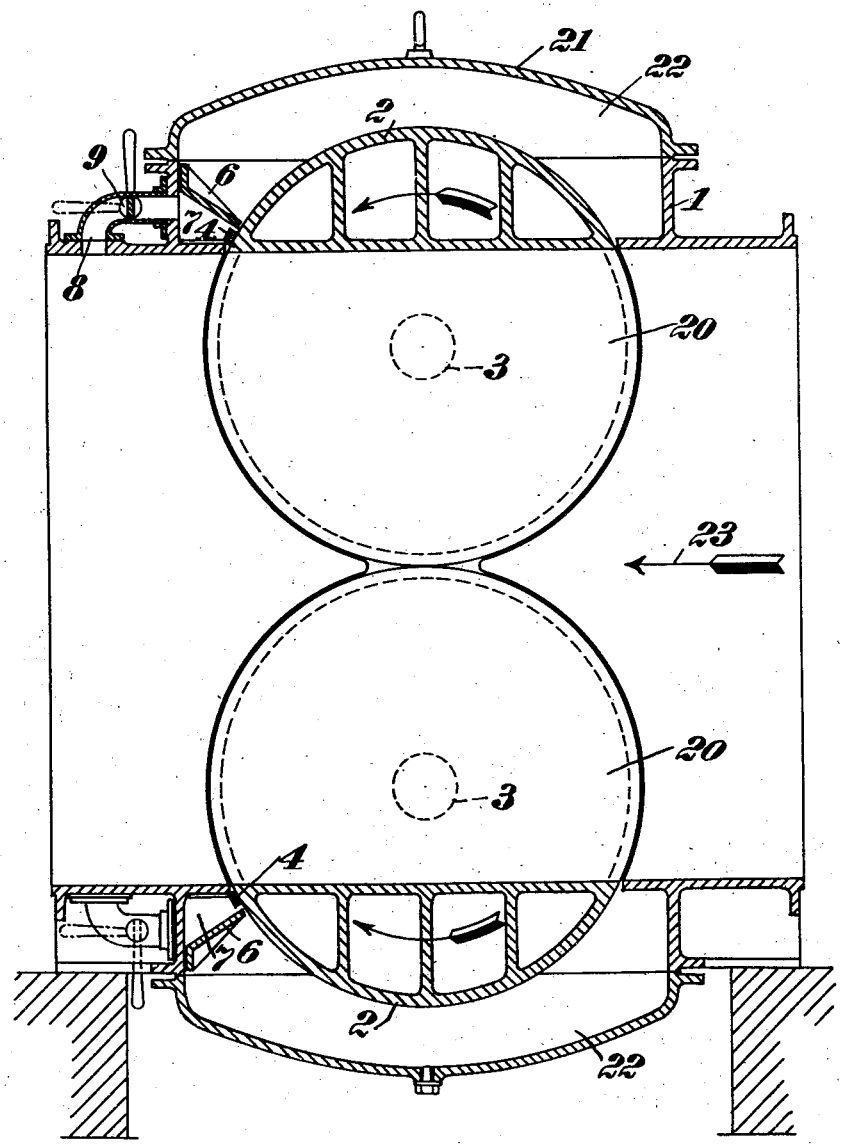
Fig. 1 is a longitudinal section of the valve in the open position, perpendicular to the cylinder axis.

In the casing 1 of the valve, rollers 2 are arranged to rotate by suitable means on pivots 3. The roller axes are preferably located in a plane perpendicular to the axis of the casing. The rollers are cylindrical and touch one another at the generatrixes which are perpendicular to the axis of the piping. In each cylinder body, partially cylindrical recess 20, arranged transversely of the cylinder, is provided, the two recesses, when brought into a position at which the valve is fully open forming a cylindrical opening within the conduit corresponding to the internal diameter of the casing 1 and the piping and coaxial therewith, so that the sectional area of flow of the pipe is not reduced at the point at which the closing cylinders are located, as in the position shown in Fig. 1.

The rollers 2 pass through the body of the casing 1 at the upper and lower edges. At these points separate auxiliary chambers 22 are formed by covers 21. The direction of flow of the water is shown by an arrow 23 in Fig. 1.

Figure 2:
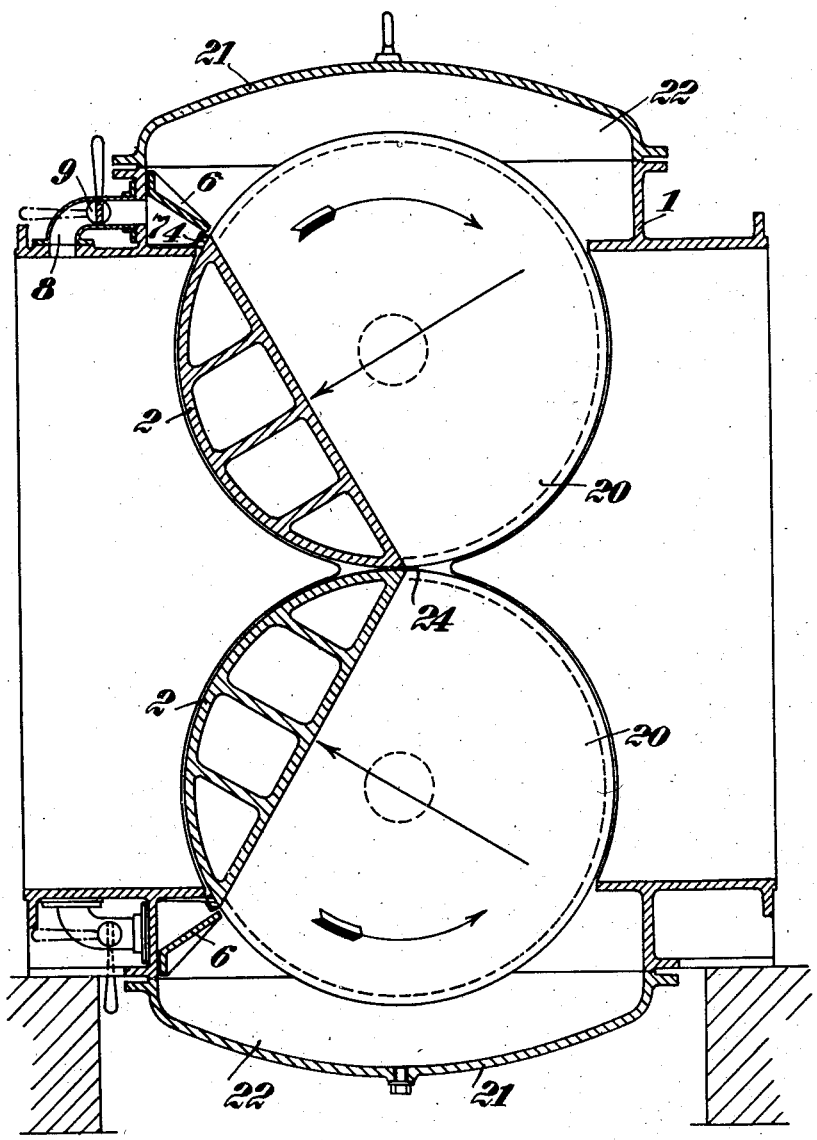
Fig. 2 is a similar section in the closed position.
Figure 3:
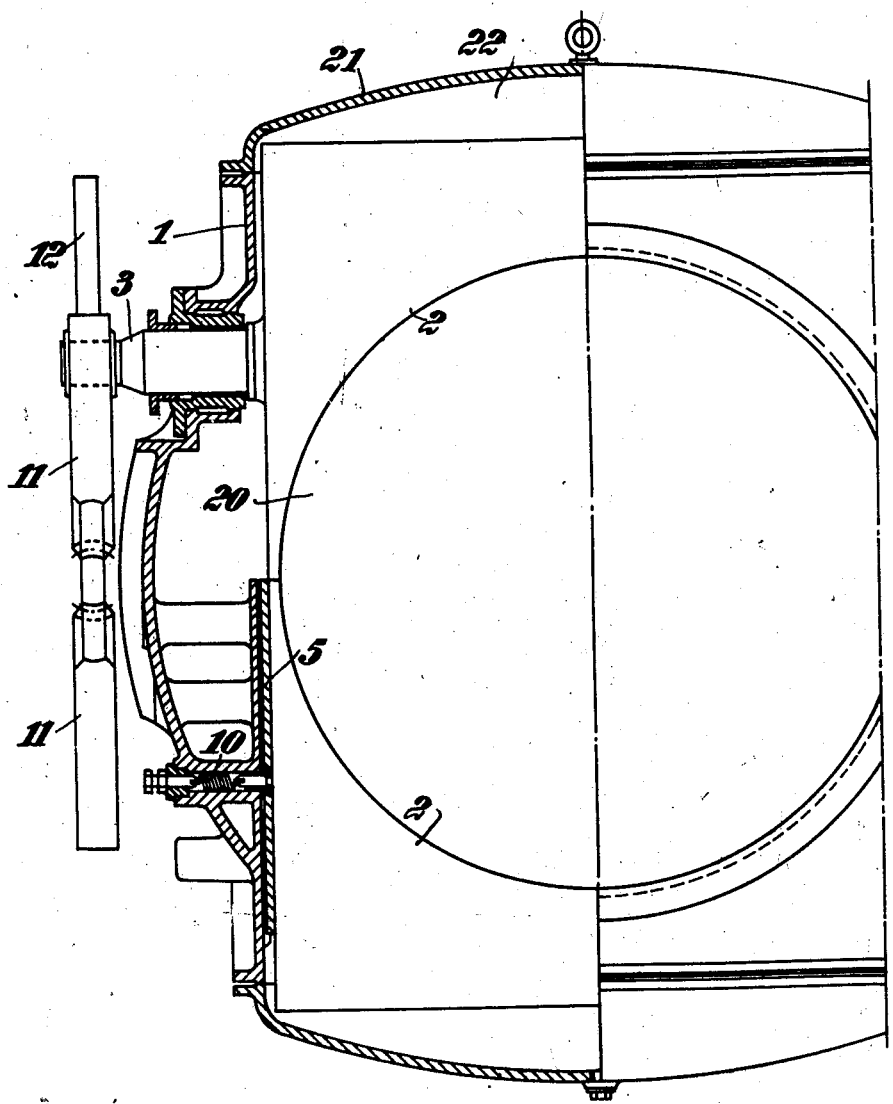
Fig. 3 is a back view partly in section.

In order to close the valve the two cylinders are rotated at the same angular velocity in opposite directions until those parts of the cylinders which are not recessed assume the position shown in Fig. 2. In the present example, rotation through opproximately 120° is necessary for this purpose. The closing surfaces of the cylinders are now inclined towards the direction of flow in a similar manner to the gates of a lock. The pressure of the water tends to force the cylinders against one another at the point of contact 24, so that water tightness is secured here without special packing means.

Figure 4:
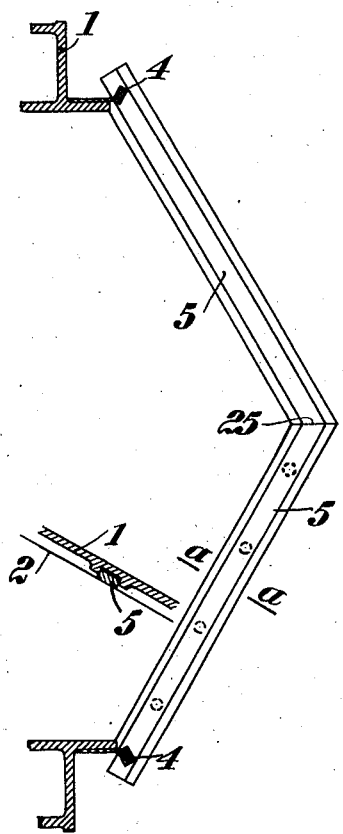
Fig. 4 shows the arrangement of the packing strips.
Figure 5:
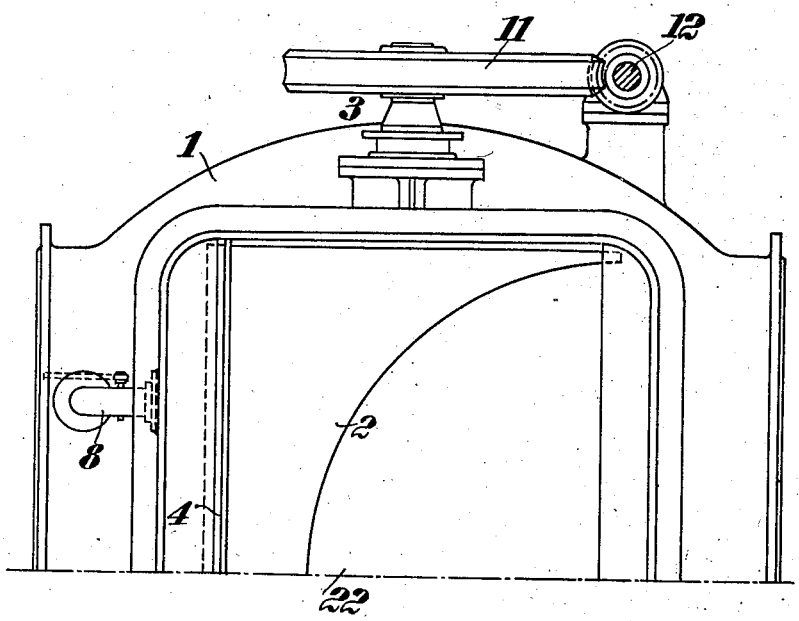
Fig. 5 is a view with the closing cover removed.

No packing is required between the casing 1 on the inflow side for the water and the chambers 22. On the other hand, between the chamber 22 and the other side of the casing a packing strip 4 is provided so that the water under pressure is prevented from flowing past this point. Packings are provided at the back of the cylinders, comprising special packing strips 5 shown in Fig. 4 which are inserted in the side walls of the casing 1 and are under the influence of adjustable springs 10. These packing strips, similarly to the closing surfaces of the cylinders, are inclined towards the direction of flow so that they are also forced towards one another at 25 by the water pressure.

In the chamber 22 at the point at which the packing strips are located, a space 7 is divided off from the chamber 22 by means of a partition 6, and is connected through a short pipe 8 and a valve 9 with the lower water side. When the cylinders are in the closed position, the passages 8 will be closed, so that the full water pressure can enter the space 7 which is connected by a narrow passage with the chamber 22, and the strip 4 is pressed against the cylinder periphery. When the cylinders are to be moved the valves 9 are opened so that the pressure is removed from the space 7 and the pressure against the strips 4 ceases, whereupon the movement of the cylinders can be carried out with facility.

In the example, the movement of the cylinders 2 is effected at the same angular velocity but in opposite directions, with the assistance of toothed segments 11 mounted on the projecting pivot ends, a worm shaft 12 acting on these segments and the worm wheels and worms being so constructed that they rotate their cylinders at the same angular velocity but in opposite directions. This drive can be replaced by any other suitable drive, for example, by sprocket wheels engaging with one another or the like. The valve possesses a number of important advantages. The longitudinal packings and the packings for the rear surfaces always maintain their position. The entrance of all foreign bodies is excluded. All parts, and particularly the packing material is conveniently accessible. There are no parts projecting high above the pipe diameter. Efficient packing is secured with the use of the simplest packing materials which are subjected to very little wear. The sectional area of flow of the pipe is in no way restricted when the valve is open. The power required for operation is small. There is no axial thrust in the worm drives described. The parts are simple to construct, and consequently the costs of production are low.

Now what I claim is:—

1. A fluid stop-valve comprising a hollow open ended casing, two recessed cylinders rotatably mounted in contact with one another transversely of the bore of said casing in such manner that the recesses therein can be moved into and out of register with the bore of the casing to open and close the latter, the construction and arrangement of these recessed cylinders being such that when they close the bore of the casing the closing surfaces are so inclined towards the high pressure side that the fluid pressure acting thereon tends to force the cylinders against one another, and means for turning said cylinders from the exterior of the casing.

2. A fluid stop-valve comprising a casing having a cylindrical bore, two cylinders therein, each having a recess, each recess being a projection of half of said bore and coaxial therewith, said cylinders being rotatably mounted in contact with one another transversely of the bore of said casing in such manner that the recesses therein can be moved into and out of register with the bore of the casing to open and close the latter, the construction and arrangement of the recessed cylinders being such that when they close the bore of the casing the closing surfaces are so inclined towards the high pressure side that the fluid pressure acting thereon tends to force the cylinders against one another, and means for turning said cylinders from the exterior of the casing.

3. A fluid stop-valve comprising a hollow open ended casing, two recessed cylinders rotatably mounted in contact with one another transversely of the bore of said casing in such manner that the recesses therein can be moved into and out of register with the bore of the casing to open and close the latter, the construction and arrangement of these cylinders being such that the cylindrical surfaces thereof project from opposite sides of the casing and that when they close the bore of the casing the closing surfaces are so inclined towards the high pressure side of the valve that the fluid pressure acting thereon tends to force the cylinders against one another, covers enclosing the portions of the cylinders which project beyond the sides of the casing, packing between the interior of these covers and the low pressure side of the casing, and means for turning the cylinders from the exterior of the casing.

4. A fluid stop-valve comprising a hollow open ended casing, two recessed cylinders rotatably mounted in contact with one another transversely of the bore of said casing in such manner that the recesses therein can be moved into and out of register with the bore of the casing to open and close the latter, the construction and arrangement of these cylinders being such that the cylindrical surfaces thereof project from opposite sides of the casing and that when they close the bore of the casing the closing surfaces are so inclined towards the high pressure side of the valve that the fluid pressure acting thereon tends to force the cylinders against one another, covers enclosing the portions of the cylinders which project beyond the sides of the casing, packing parallel to the axes of the cylinders between the interior of these covers and the low pressure side of the casing, and means for turning the cylinders from the exterior of the casing.

5. A fluid stop-valve comprising a casing having a cylindrical bore, two cylinders, the diameter of each of which is greater than the radius of the cylindrical bore and arranged transversely of said casing, a recess in each of said cylinders, each recess being a projection of half of said bore and coaxial therewith, means for rotating the cylinders in said casing so that the recesses therein can be moved into and out of register with the bore of the casing to open and close the latter, covers enclosing the portions of the cylinders which project beyond the sides of the casing, partitions dividing the spaces between these covers and the cylinders into two compartments having restricted communication with one another, packing between one of each of these compartments and the low pressure side of the casing, and means for turning the cylinders from the exterior of the casing.

6. A fluid stop-valve comprising a casing having a cylindrical bore, two cylinders the diameter of each of which is greater than the radius of the cylindrical bore and arranged transversely of said casing, a recess in each of said cylinders, each recess being a projection of half of said bore and coaxial therewith, means for rotating the cylinders in said casing so that the recesses therein can be moved into and out of register with the bore of the casing to open and close the latter, covers enclosing the portions of the cylinders which project beyond the sides of the casing, partitions dividing the spaces between these covers and the cylinders into two compartments having restricted communication with one another, packing between one of each of these compartments and the low pressure side of the casing, means connecting these same compartments with the low pressure side of the casing, and means for turning the cylinders from the exterior of the casing.

7. A fluid stop-valve comprising a casing having a cylindrical bore, two cylinders the diameter of each of which is greater than the radius of the cylindrical bore and arranged transversely of said casing, a recess in each of said cylinders, each recess being a projection of half of said bore and coaxial therewith, means for rotating the cylinders in said casing so that the recesses therein can be moved into and out of register with the bore of the casing to open and close the latter, covers enclosing the portions of the cylinders which project beyond the sides of the casing, partitions dividing the spaces between these covers and the cylinders into two compartments having restricted communication with one another, packing between one of each of these compartments and the low pressure side of the casing, conduits connecting these same compartments with the low pressure side of the casing, means for closing said conduits, and means for turning the cylinders from the exterior of the casing.

8. A fluid stop-valve comprising a casing having a cylindrical bore, two cylinders each having a recess, each recess being a projection of said bore and coaxial therewith, said cylinders being mounted transversely of said casing in such manner that the recesses therein can be moved into and out of register with the bore of the casing to open and close the latter, worm segments of opposite pitch located exteriorly of the casing and connected with said cylinders, and worms mounted on a common shaft engaging said segments.

In testimony whereof I affix my signature.

KARL SCHLAGENHAUFF.